United States Patent

Miyamoto (10) Patent No.: US 10,775,619 B2
(45) Date of Patent: Sep. 15, 2020

(54) VIRTUAL IMAGE DISPLAY DEVICE

(71) Applicant: Panasonic Intellectual Property Management Co., Ltd., Osaka (JP)

(72) Inventor: Tomoaki Miyamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 15/781,507

(22) PCT Filed: Nov. 30, 2017

(86) PCT No.: PCT/JP2017/042983
§ 371 (c)(1),
(2) Date: Jun. 5, 2018

(87) PCT Pub. No.: WO2018/116778
PCT Pub. Date: Jun. 28, 2018

(65) Prior Publication Data
US 2019/0162956 A1 May 30, 2019

(30) Foreign Application Priority Data
Dec. 21, 2016 (JP) ................................. 2016-247942

(51) Int. Cl.
*G02B 27/01* (2006.01)
*B60K 35/00* (2006.01)
*G02B 27/18* (2006.01)

(52) U.S. Cl.
CPC .......... *G02B 27/0101* (2013.01); *B60K 35/00* (2013.01); *G02B 27/0149* (2013.01);
(Continued)

(58) Field of Classification Search
None
See application file for complete search history.

(56) References Cited

U.S. PATENT DOCUMENTS 4,696,554 A * 9/1987 Seawright ............. G02B 5/124
359/851
9,720,228 B2 * 8/2017 Harrison ............. G02B 27/017
(Continued)

FOREIGN PATENT DOCUMENTS

JP 2000-241748 9/2000
JP 2015-194707 11/2015
(Continued)

OTHER PUBLICATIONS

International Search Report of PCT application No. PCT/JP2017/042983 dated Feb. 6, 2018.

*Primary Examiner* — Jennifer D. Carruth
(74) *Attorney, Agent, or Firm* — Wenderoth, Lind, Ponack, L.L.P.

(57) ABSTRACT

A virtual image display device includes: a projection member that projects an image; and a projection optical system that forms a virtual image. A virtual image distance from an observer to the virtual image is not less than 2,500 mm. The projection optical system has one or more reflectors. A reflection surface of a final reflector that is included in one or more reflectors and finally reflects a light ray satisfies the following Conditional Relation 1:

$$10° \le |\theta z\, max - \theta z\, min| \le 30°$$ Conditional Relation 1 where $\theta z$ is an angle between a normal vector perpendicular to a tangent plane passing through an origin of the final reflector and a normal vector with respect to a tangent plane at any given point on the final reflector, $\theta z\, max$ is a maximum value of $\theta z$, and $\theta z\, min$ is a minimum value of $\theta z$. This arrangement provides a small-size virtual image display device.

6 Claims, 6 Drawing Sheets

(52) U.S. Cl.
CPC ........ *G02B 27/18* (2013.01); *B60K 2370/334* (2019.05); *G02B 2027/011* (2013.01); *G02B 2027/0123* (2013.01)

(56) References Cited

U.S. PATENT DOCUMENTS

| | | | |
|---|---|---|---|
| 2002/0036831 A1* | 3/2002 | Inoguchi | G02B 27/0172 359/630 |
| 2011/0157708 A1* | 6/2011 | Kuo | G02B 17/006 359/630 |
| 2016/0195719 A1 | 7/2016 | Yonetani | |
| 2017/0115485 A1 | 4/2017 | Saito et al. | |
| 2017/0146803 A1 | 5/2017 | Kishigami et al. | |
| 2017/0248786 A1 | 8/2017 | Kuzuhara et al. | |
| 2018/0081174 A1 | 3/2018 | Yatsu et al. | |

FOREIGN PATENT DOCUMENTS

| | | |
|---|---|---|
| JP | 2016-014861 | 1/2016 |
| WO | 2015/190157 | 12/2015 |
| WO | 2016/079927 | 5/2016 |
| WO | 2016/162928 | 10/2016 |

* cited by examiner

VIRTUAL IMAGE DISPLAY DEVICE

This application is a U.S. national stage application of the PCT International Application No. PCT/JP2017/042983 filed on Nov. 30, 2017, which claims the benefit of foreign priority of Japanese patent application No. 2016-247942 filed on Dec. 21, 2016, the contents all of which are incorporated herein by reference.

TECHNICAL FIELD

The present disclosure relates to a virtual image display device that enables an observer to visually recognize a displayed image as a virtual image via reflector.

BACKGROUND ART

PTL 1 discloses a small-size virtual image display device that has small screen distortion in an entire viewpoint area of an observer.

CITATION LIST

Patent Literature

PTL 1: Unexamined Japanese Patent Publication No. 2015-194707

SUMMARY OF THE INVENTION

A virtual image display device of the present disclosure projects an image on a projection target member to form a virtual image opposing an observer via the projection target member. The virtual image display device includes: a projection member that projects an image; and a projection optical system that leads the image to a projection target member to form a virtual image. A virtual image distance VID (Virtual Image Distance) from a center of a visual recognition area of an observer to a center of the virtual image is not less than 2,500 mm. The projection optical system has at least one reflector. On an optical path from the projection member toward the virtual image, a reflection surface of a final reflector that is included in the at least one reflector and finally reflects a light ray satisfies the following Conditional Relation 1:

$$10° \leq |\theta z\ max - \theta z\ min| \leq 30° \quad \text{Conditional Relation 1}$$

where:

$\theta z$ is an angle between a normal vector perpendicular to a tangent plane passing through an origin of a definitional equation defining a shape of the final reflector and a normal vector with respect to a tangent plane at any given point on the final reflector;

$\theta z\ max$ is a maximum value of $\theta z$; and $\theta z\ min$ is a minimum value of $\theta z$.

According to the present disclosure, it is possible to provide a small-size virtual image display device.

DESCRIPTION OF EMBODIMENTS

Hereinafter, exemplary embodiments will be described in detail with reference to the drawings. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the accompanying drawings and the following description are provided to help those skilled in the art to sufficiently understand the present disclosure, and are not intended to limit the subject matter of the claims.

[1. Configuration]
[1.1 Schematic Configuration]

Schematic configurations of virtual image display devices according to the first to third exemplary embodiments will be described with reference to the drawings. In the following, a head-up display mounted on a vehicle will be described as an example of a virtual image display device.

Figure 1:
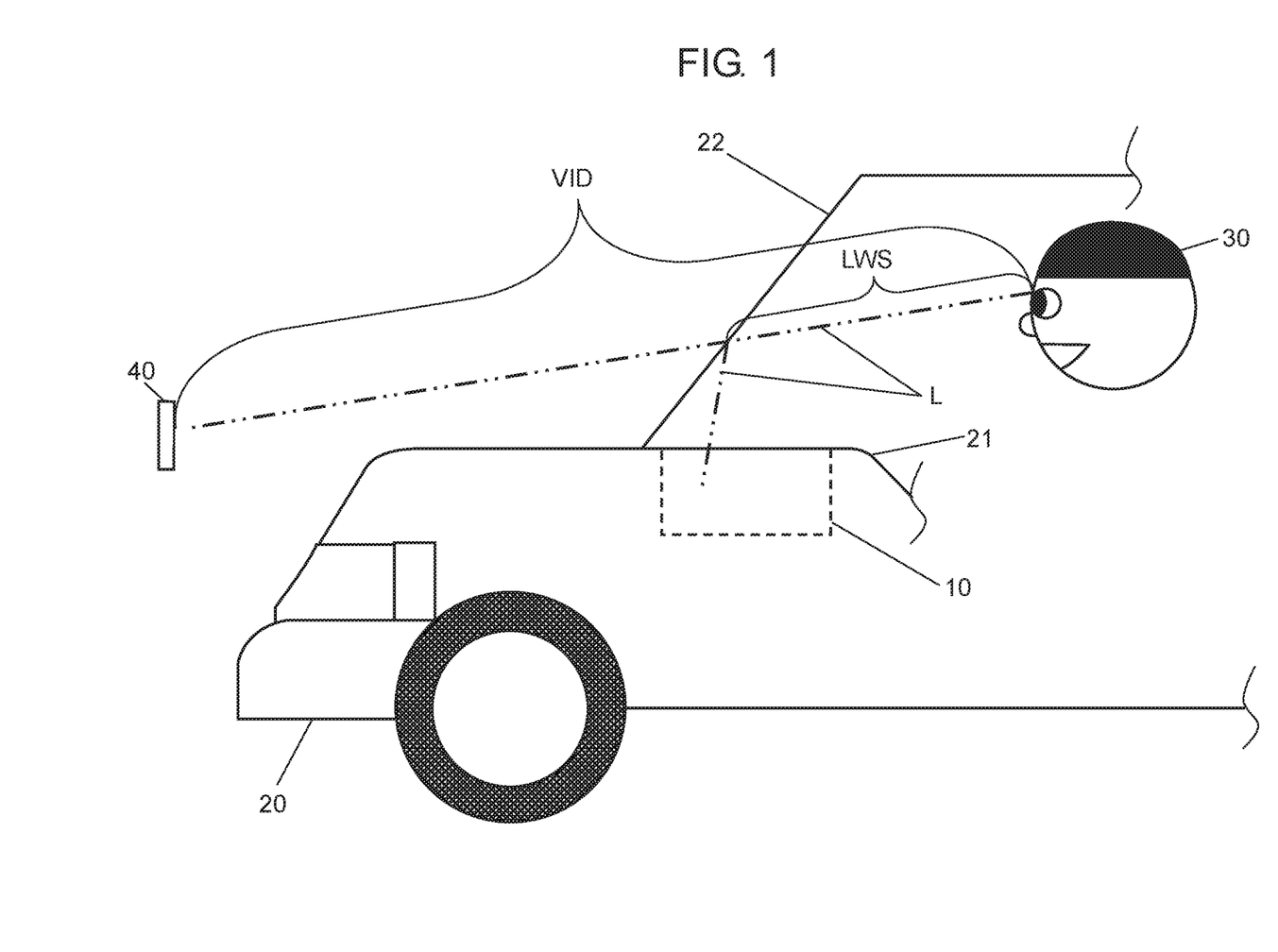
FIG. 1 is a schematic diagram showing a cross-section of a vehicle on which a virtual image display device of the present disclosure is mounted.

FIG. 1 is a schematic diagram showing a cross-section of a vehicle on which a head-up display according to the first to third exemplary embodiments is mounted.

As shown in FIG. 1, head-up display 10 that projects an image is disposed inside dashboard 21 of vehicle 20. Head-up display 10 projects an image on windshield 22 (or combiner 60 of FIG. 4 to be described later) that is disposed on vehicle 20 and is a light transmissive projection target member. Thus, virtual image 40 of the image projected by head-up display 10 is formed on a side of windshield 22 opposite to observer 30 side. This arrangement enables observer 30 to visually recognize, through windshield 22, virtual image 40 of the image projected by head-up display 10. Note that a two-dot chain line shown in FIG. 1 represents central optical path L of the projected image. Also in the following description, central optical path L is depicted as a two-dot chain line in a similar way.

First Exemplary Embodiment

Figure 2:
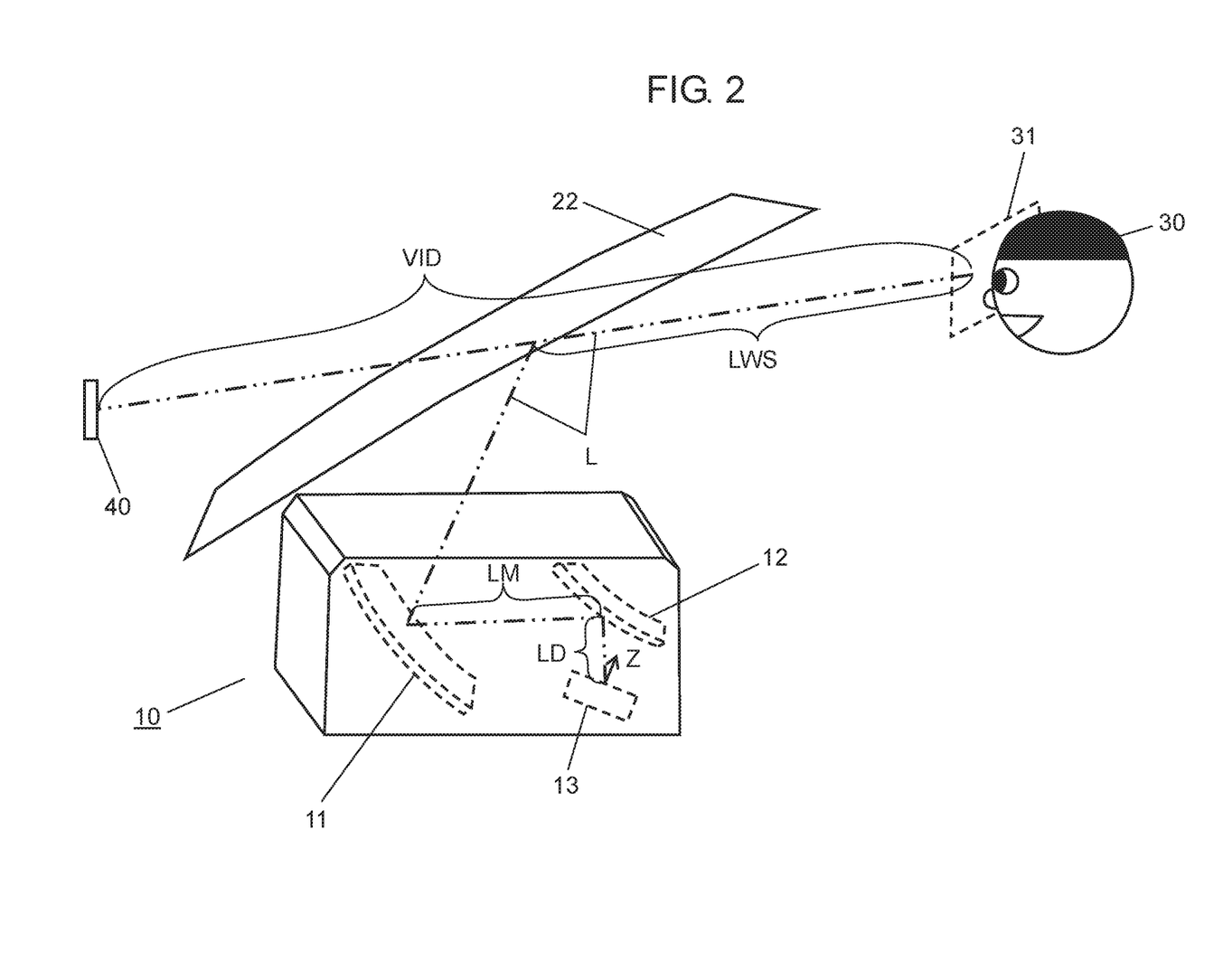
FIG. 2 is a schematic diagram showing an optical cross-section for illustrating a head-up display according to a first exemplary embodiment.

FIG. 2 is a schematic diagram of head-up display 10 according to the first exemplary embodiment.

As shown in FIG. 2, head-up display 10 of the present exemplary embodiment includes LCD 13 (Liquid Crystal Display) that constitutes a projection member, and a projection optical system. The projection optical system leads an image displayed on LCD 13 to windshield 22 to form virtual image 40.

That is, head-up display 10 projects the image on windshield 22, which is the projection target member. Thus, head-up display 10 forms virtual image 40 opposing observer 30 via windshield 22.

Projection optical system includes reflector 12 and final reflector 11. Final reflector 11 is disposed approximately vertically downward (including the vertical downward direction) from windshield 22 to lead the light from LCD 13 to windshield 22. Final reflector 11 has a rotationally asymmetric shape, and a reflection surface of final reflector 11 is formed in a concave shape. Note that, reflector 12 has a reflection surface configured in a convex shape. Since reflector 12 is provided, projection optical system is downsized.

The above arrangement enables observer 30 to visually recognize, through windshield 22, virtual image 40 of the image. That is, observer 30 can visually recognize virtual image 40 of the image projected on windshield 22, through eye box 31 that is a previously estimated visual recognition area.

Note that on a middle of an optical path that leads the light from LCD 13 to final reflector 11, there may be provided, for example, an optical element such as one or more of lens elements or reflectors in addition to the above-mentioned reflector 12. This arrangement can well correct aberrations, in particular, curvature of field, distortion, and astigmatism. In addition, an effect such as downsizing can be achieved.

Second Exemplary Embodiment

Figure 3:
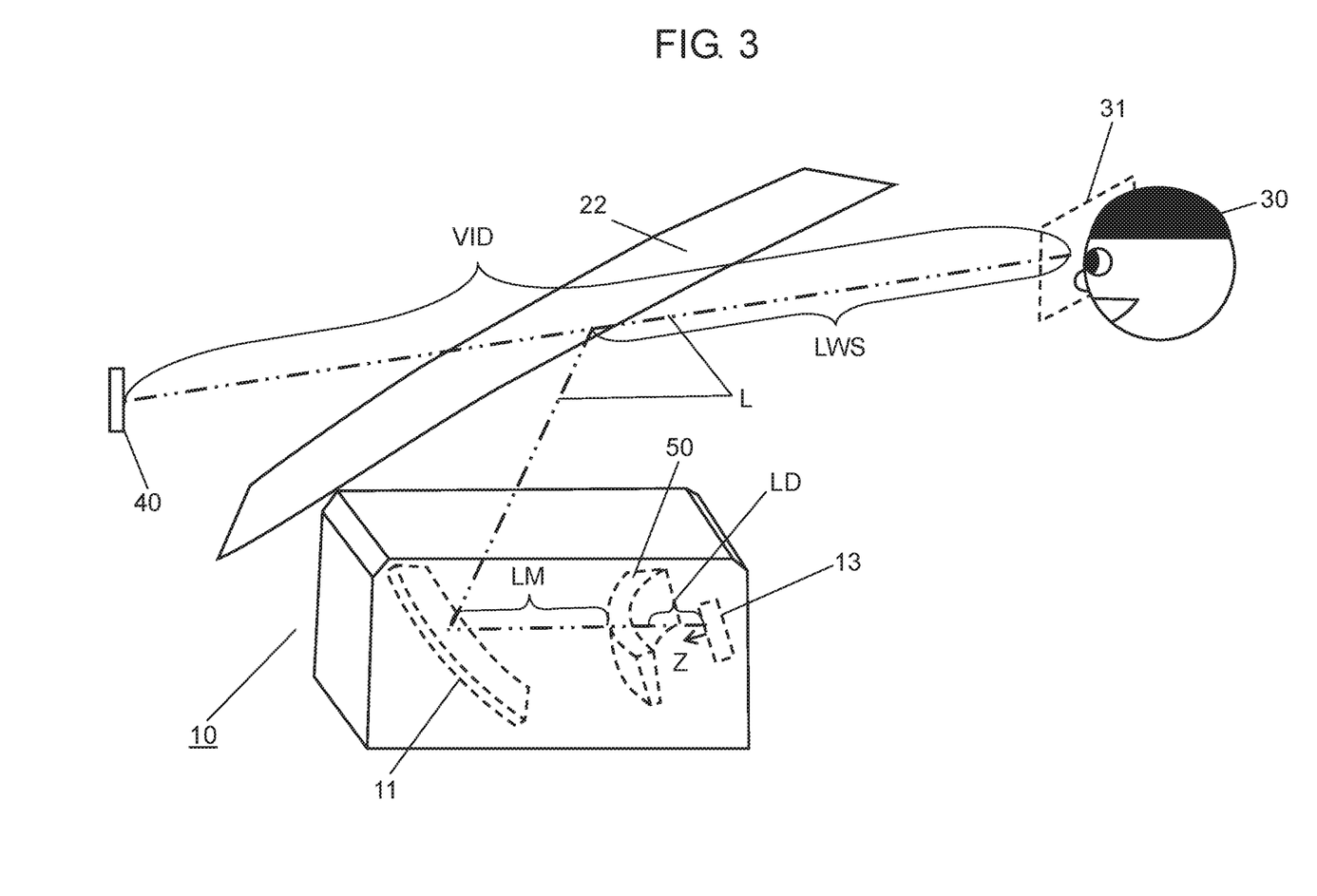
FIG. 3 is a schematic diagram showing an optical cross-section for illustrating a head-up display according to a second exemplary embodiment.

FIG. 3 is a schematic diagram of head-up display 10 according to the second exemplary embodiment.

As shown in FIG. 3, similarly to the first exemplary embodiment, head-up display 10 of the present exemplary embodiment includes LCD 13, which is a projection member, and a projection optical system. The projection optical system leads an image displayed on LCD 13 to windshield 22 to form virtual image 40. That is, head-up display 10 projects the image on windshield 22, which is the projection target member. Thus, head-up display 10 forms virtual image 40 opposing observer 30 via windshield 22.

The projection optical system includes lens element 50 and final reflector 11. Final reflector 11 is disposed approximately vertically downward (including the vertical downward direction) from windshield 22 to lead the light from LCD 13 to windshield 22. Final reflector 11 is formed to have a surface in a concave shape on observer 30 side of final reflector 11. Note that lens element 50 is rotationally asymmetric and is configured in, for example, a meniscus shape having a positive or negative power. By providing lens element 50, downsizing can be achieved, and aberration of final reflector 11 can be further reduced.

The above arrangement enables observer 30 to visually recognize, through windshield 22, virtual image 40 of the image. That is, observer 30 can visually recognize virtual image 40 of the image projected on windshield 22, through eye box 31 that is a previously estimated visual recognition area.

Note that a plurality of lens elements may be disposed. Further, in order to lead the light from LCD 13 to final reflector 11, one or more reflectors may be disposed in addition to the lens element. This arrangement can well correct aberrations, in particular, curvature of field, distortion, and astigmatism.

Third Exemplary Embodiment

Figure 4:
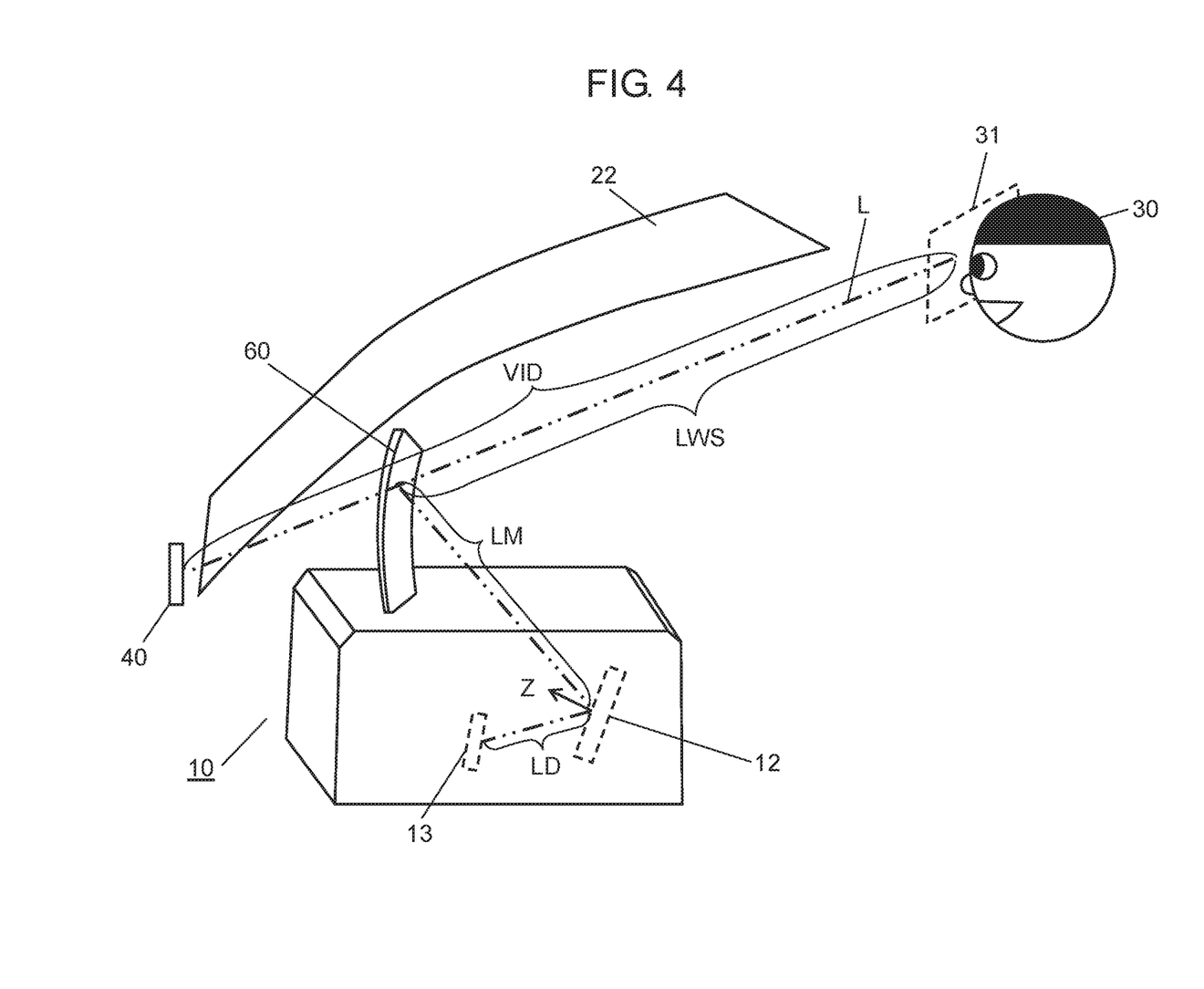
FIG. 4 is a schematic diagram showing an optical cross-section for illustrating a head-up display according to a third exemplary embodiment.

FIG. 4 is a schematic diagram of head-up display 10 according to the third exemplary embodiment.

As shown in FIG. 4, head-up display 10 of the present exemplary embodiment includes LCD 13, which is a projection member, combiner 60 constituting a projection target member, and a projection optical system. The projection optical system leads an image displayed on LCD 13 to combiner 60 to form virtual image 40. That is, head-up display 10 projects the image on combiner 60. Thus, head-up display 10 forms virtual image 40 opposing observer 30 via combiner 60.

Projection optical system includes reflector 12 and combiner 60. Combiner 60 is configured with a half-transmissive member made of, for example, resin. Combiner 60 is the projection target member and functions also as the final reflector. Combiner 60 is disposed approximately vertically downward (including vertical downward direction) from windshield 22. Combiner 60 is formed to have a surface in a concave shape on observer 30 side of combiner 60. Reflector 12 leads the light from LCD 13 to combiner 60. The above arrangement enables observer 30 to visually recognize virtual image 40 of the image, through combiner 60 and over windshield 22. That is, observer 30 can visually recognize an image projected on combiner 60 as virtual image 40 through eye box 31, which is a previously estimated visual recognition area.

Note that, reflector 12 of projection optical system is not essential, and the light from LCD 13 may be directly led to combiner 60. Alternatively, the projection optical system may have one or more lens elements disposed on an optical path. Further, in addition to the lens element, a plurality of reflectors may be arranged to lead the light from LCD 13 to combiner 60.

[1.2 Projection Member]

Figure 5:
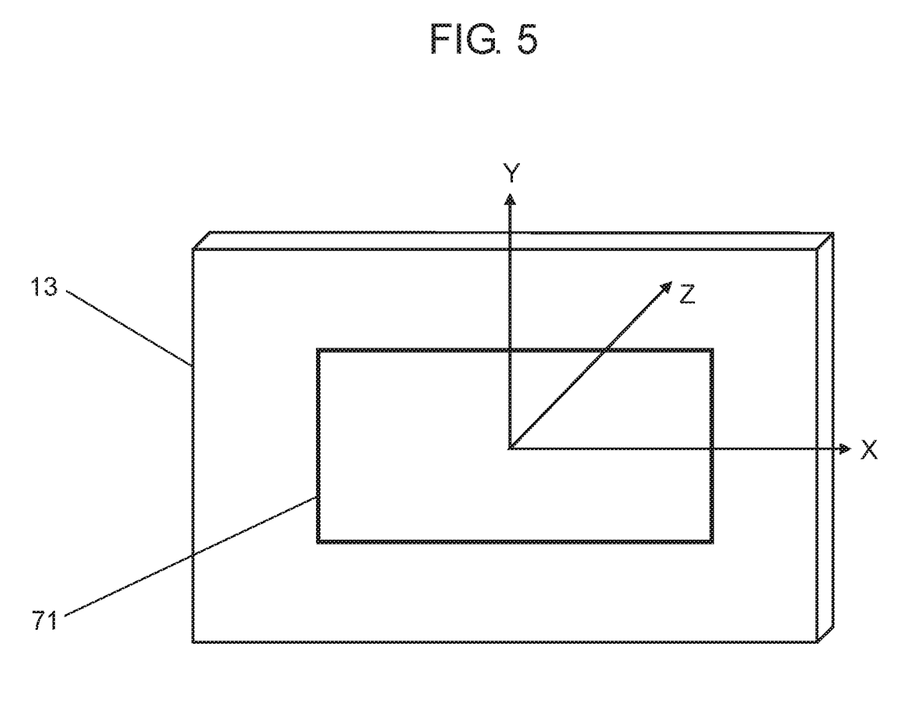
FIG. 5 is a schematic diagram showing a coordinate system of a projection member according to the first to third exemplary embodiments.

FIG. 5 is a schematic diagram showing a coordinate system of the projection member in the first to third exemplary embodiments.

The projection member is configured with LCD 13 or the like as described above and displays projected display image 71.

Note that in the first to third exemplary embodiments, as an example, LCD 13 is described as the projection member; however, the projection member is not limited to LCD 13. The projection member may be a display device such as an organic light-emitting diode (electroluminescence), a fluorescent display device (seven segments), or a plasma display. Alternatively, a projector and a scanning laser may be used.

[1.3 Detailed Configuration of Final Reflector]

Figure 6:
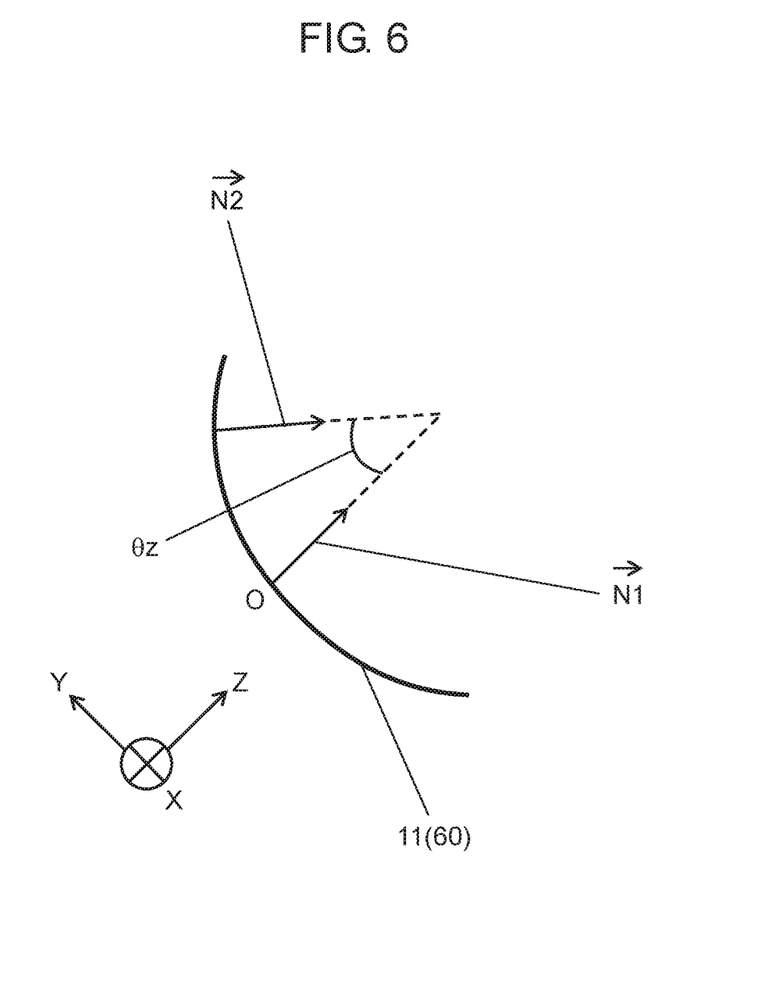
FIG. 6 is an explanatory diagram of an inclination angle $\theta z$ of a final reflector of a projection optical system in the virtual image display device according to the first to third exemplary embodiment.

FIG. 6 is a diagram for illustrating an inclination angle θz of final reflector 11 in the first to third exemplary embodiments.

As shown in FIG. 6, the reflection surface of final reflector 11 is formed to have a surface in a concave shape on observer 30 side.

In this arrangement, the reflection surface in a concave shape has an inclination angle θz defined as below. First, an origin of a definitional equation defining the shape of the reflection surface is denoted by O. Then, a normal vector with respect to the reflection surface at origin O is denoted by N1, and a normal vector at any given point on the reflection surface is denoted by N2. Thus, the inclination angle θz is defined to be an angle between normal vector N1 and normal vector N2.

[2. Condition, Effect, and the Like]

As described in the first to third exemplary embodiments, head-up display 10, which is the virtual image display device, includes LCD 13 and the projection optical system. LCD 13 constitutes the projection member that, projects an image. The projection optical system leads the image to the projection target member to form virtual image 40. That is, head-up display 10 projects the image on windshield 22 or combiner 60, which are respectively the projection target member and the final reflector. Thus, head-up display 10 forms virtual image 40 opposing observer 30 via the projection target member or combiner 60.

In this arrangement, a virtual image distance VID (Virtual Image Distance) of head-up display 10 of the first to third exemplary embodiments is set equal to or greater than 2,500 mm, where the virtual image distance VID is a distance from a center of eye box 31 as visual recognition area of observer 30, through which virtual image 40 is visually recognized, to a center of virtual image 40.

The projection optical system has at least one reflector (final reflector 11, reflector 12, combiner 60, and the like). On an optical path from LCD 13 toward virtual image 40, the reflection surface of final reflector 11 (the first and second exemplary embodiment) that is included in the reflectors (final reflector 11, reflector 12, combiner 60, and the like) and that finally reflects a light ray or the reflection surface of combiner 60 (third exemplary embodiment) satisfies the following Conditional Relation 1:

$$10° \leq |\theta z \text{ max} - \theta z \text{ min}| \leq 30° \qquad \text{Conditional Relation 1}$$

where:

$\theta z$ is an angle between normal vector N1 perpendicular to a tangent plane passing through an origin O of a definitional equation defining a shape of final reflector 11 (or combiner 60) and normal vector N2 with respect to a tangent plane at any given point on final reflector 11 (or combiner 60);

$\theta z$ max is a maximum value of $\theta z$; and $\theta z$ min is a minimum value of $\theta z$.

That is, if the value is lower than the lower limit value 10° of Conditional Relation 1, a power of final reflector 11 (or combiner 60) becomes weak. Therefore, a whole optical path length gets longer, and the virtual image display device becomes large. On the other hand, if the value exceeds an upper limit value 30° of Conditional Relation 1, power of final reflector 11 (or combiner 60) becomes too strong. Results of experiments show that if $|\theta z \text{ max} - \theta z \text{ min}|$ exceeds 30°, a temperature of a member in head-up display 10 exceeds, for example, 90 degrees in some cases due to concentrated sun light or other causes. This can create a defect such as a dead pixel in LCD 13. To avoid this issue, a cooling device or the like is required.

More preferably, the upper limit of $|\theta z \text{ max} - \theta z \text{ min}|$ in Conditional Relation 1 is not greater than 27°. Further, the upper limit of $|\theta z \text{ max} - \theta z \text{ min}|$ in Conditional Relation 1 is especially preferably not greater than 24°. Thus, it is possible to further prevent or reduce upsizing of the virtual image display device and a problem of the creation of a defect pixel in LCD 13.

That is, by forming the reflection surface of final reflector 11 within a range of Conditional Relation 1, head-up display 10 can be downsized.

Further, head-up display 10 according to each of the exemplary embodiments preferably satisfies the following Conditional Relation 2:

$$0.01 \leq LWS/VID \leq 0.60 \qquad \text{Conditional Relation 2}$$

where LWS is a distance from observer 30 to windshield 22 (combiner 60 in the case of the third exemplary embodiment) on a straight line connecting a center of eye box 31 of observer 30 and the center of virtual image 40.

If the value is lower than the lower limit value 0.01 of Conditional Relation 2, the optical path length of the projection optical system becomes long. Therefore, head-up display 10 becomes large. On the other hand, if the value exceeds the upper limit value 0.6 of Conditional Relation 2, the optical path length of the projection optical system becomes short. Therefore, interference is caused between a light ray and the projection member or between a light ray and the reflector. That is, there is caused physical interference that a part of the projection member or the reflector blocks the optical path of the light ray, for example.

That is, by configuring head-up display 10 within a range of Conditional Relation 2, head-up display 10 can be downsized, and interference can be prevented from being caused.

More preferably, the upper limit of LWS/VID in Conditional Relation 2 is not greater than 0.50. Further, the upper limit of LWS/VID in Conditional Relation 2 is especially preferably not greater than 0.40. Thus, head-up display 10 can be further downsized, and the occurrence of interference can be further prevented or reduced.

Further, head-up display 10 according to each of the exemplary embodiments preferably satisfies the following Conditional Relation 3:

$$1.0 \leq LM/LD \leq 8.0 \qquad \text{Conditional Relation 3}$$

where:

LM is a distance between final reflector 11 (or combiner 60) and the optical element that is one element before final reflector 11 (or combiner 60), on central optical path L of the projection optical system extending from LCD 13 to virtual image 40; and LD is a distance between LCD 13 and the optical element that is one element before final reflector 11 (or combiner 60), on central optical path L.

Note that the optical element that is one element before final reflector 11 (or combiner 60) corresponds to reflector 12 in the case of the first and third exemplary embodiments, and corresponds to lens element 50 in the case of the second exemplary embodiment.

If the value is lower than the lower limit value 1.0 of Conditional Relation 3, the distance between LCD 13 and the optical element becomes long, and the device therefore becomes large. If the value exceeds the upper limit value 8.0 of Conditional Relation 3, the distance between LCD 13 and the optical element becomes too short. Therefore, interference is caused between LCD 13 and a light ray. That is, there is caused physical interference that a part of LCD 13 blocks the optical path of the light ray, for example.

That is, by configuring head-up display 10 within a range of Conditional Relation 3, head-up display 10 can be downsized, and interference can be prevented from being caused.

In this arrangement, it is more preferable that either one or both of the following Conditional Relation 3a and Conditional Relation 3b be satisfied.

$$1.2 \leq LM/LD \qquad \text{Conditional Relation 3a}$$

$$LM/LD \leq 6.5 \qquad \text{Conditional Relation 3b}$$

These conditions allow the above-mentioned effects to be more improved.

More preferably, either one of or both of the following Conditional Relation 3c and Conditional Relation 3d are satisfied.

$$1.5 \leq LM/LD \qquad \text{Conditional Relation 3c}$$

$$LM/LD \leq 4.5 \qquad \text{Conditional Relation 3d}$$

These conditions allow the above-mentioned effects to be more improved.

NUMERICAL EXAMPLES

Hereinafter, the virtual image display device in the present disclosure will be described with reference to concrete numerical examples. Note that in the numerical examples to be described below, the unit of length in the tables is millimeter (mm), and the unit of angle is degree.

In the numerical examples, a free-form surface is defined by the following Equations 1 and 2.

$$z = \frac{cr^2}{\sqrt{1-(1+k)c^2r^2}} + \sum_{j=2} c_j x^m y^n \qquad \text{[Equation 1]}$$

$$j = \frac{(m+n)^2 + m + 3n}{2} + 1 \qquad \text{[Equation 2]}$$

In the equations, z is a sag amount at a position (x, y) with respect to an axis defining a surface, r is a radius of curvature at the origin of the axis defining the surface, c is a curvature at the origin of the axis defining the surface, k is a conic constant, m and n are integers satisfying Equation 2, and $C_j$ is a coefficient in the monomial $x^m y^n$.

Further, in each of the numerical examples, an origin of a coordinate is at a center of display image 71 of LCD 13 shown in FIG. 5, where an X-axis, a Y-axis, and a Z-axis are defined.

Further, in eccentricity data in each numerical example, ADE represents an amount of rotation about the X-axis from a Z-axis direction to a Y-axis direction, BDE represents an amount of rotation about the Y-axis from an X-axis direction to the Z-axis direction, and CDE represents an amount of rotation about the Z-axis from the X-axis direction to the Y-axis direction.

Numerical Example 1

Numerical Example 1 is an example of the projection optical system of the first exemplary embodiment. Configuration data of the projection optical system of Numerical Example 1 is shown in Table 1, curvatures of windshield 22 are shown in Table 2, and coefficients of a polynomial free-form surface are shown in Table 3.

TABLE 1

| | SURFACE | | ECCENTRICITY DATA | | | | | |
|---|---|---|---|---|---|---|---|---|
| | NUMBER | SHAPE | X | Y | Z | ADE | BDE | CDE |
| DISPLAY SURFACE | 1 | | 0 | 0 | 0 | 0 | 0 | 0 |
| FIRST MIRROR | 2 | FREE-FORM SURFACE | −3.39872 | 10.83487 | 40.4358 | −27.6184 | −4.1592 | −3.92 |
| SECOND MIRROR | 3 | FREE-FORM SURFACE | −31.07079 | 148.91145 | −7.09733 | −45.4009 | −3.7141 | −21.3265 |
| WINDSHIELD | 4 | TOROIDAL | −47.90601 | 72.30522 | 226.41961 | 41.7542 | −7.2771 | −4.7861 |
| OBSERVER | 5 | | −204.386 | −731.8566 | 454.8508 | 101.2507 | −11.4079 | 9.6586 |

TABLE 2

| SURFACE NUMBER | X-CURVATURE | Y-CURVATURE |
|---|---|---|
| 4 | −6.18E−05 | −0.000318 |

TABLE 3

| SURFACE NUMBER | POLYNOMIAL COEFFICIENT | | | |
|---|---|---|---|---|
| 2 | c (CURVATURE) | 7.4090.E−03 | | |
| | C1 | 0.0000.E+00 | C19 | 2.9570.E−09 |
| | C2 | 0.0000.E+00 | C20 | 1.5965.E−09 |
| | C3 | 0.0000.E+00 | C21 | −3.9738.E−10 |
| | C4 | −2.3515.E−03 | C22 | 2.3512.E−12 |
| | C5 | 5.9997.E−04 | C23 | 1.1346.E−11 |
| | C6 | −3.0920.E−03 | C24 | −2.2866.E−11 |
| | C7 | 5.9971.E−06 | C25 | −1.8275.E−11 |
| | C8 | −1.5161.E−05 | C26 | −3.8750.E−11 |
| | C9 | 7.8670.E−07 | C27 | −5.0893.E−12 |
| | C10 | −1.0625.E−05 | C28 | 3.3364.E−11 |
| | C11 | −1.8157.E−07 | C29 | 0.0000.E+00 |
| | C12 | −1.5198.E−07 | C30 | 0.0000.E+00 |
| | C13 | −6.5411.E−08 | C31 | 0.0000.E+00 |
| | C14 | −2.5476.E−07 | C32 | 0.0000.E+00 |
| | C15 | −6.2195.E−08 | C33 | 0.0000.E+00 |
| | C16 | −6.5831.E−10 | C34 | 0.0000.E+00 |
| | C17 | 1.7682.E−09 | C35 | 0.0000.E+00 |
| | C18 | 2.7623.E−09 | C36 | 0.0000.E+00 |
| 3 | c (CURVATURE) | −2.8120.E−03 | | |
| | C1 | 0.0000.E+00 | C19 | 2.3064.E−11 |
| | C2 | 0.0000.E+00 | C20 | −8.9372.E−12 |
| | C3 | 0.0000.E+00 | C21 | −2.2712.E−13 |
| | C4 | 2.5419.E−03 | C22 | 1.9168.E−14 |
| | C5 | 2.2052.E−04 | C23 | −2.4337.E−14 |
| | C6 | 2.4841.E−03 | C24 | 8.3718.E−14 |
| | C7 | 7.8162.E−07 | C25 | −1.6095.E−13 |
| | C8 | −7.9813.E−07 | C26 | 1.8556.E−13 |
| | C9 | 6.7979.E−07 | C27 | −1.1520.E−13 |
| | C10 | −9.2832.E−07 | C28 | −1.0864.E−14 |
| | C11 | 3.2581.E−09 | C29 | 0.0000.E+00 |
| | C12 | −1.3527.E−09 | C30 | 0.0000.E+00 |
| | C13 | 8.3043.E−09 | C31 | 0.0000.E+00 |
| | C14 | −1.2279.E−09 | C32 | 0.0000.E+00 |
| | C15 | 2.3378.E−09 | C33 | 0.0000.E+00 |
| | C16 | 8.2290.E−13 | C34 | 0.0000.E+00 |
| | C17 | −2.4031.E−12 | C35 | 0.0000.E+00 |
| | C18 | −8.4603.E−12 | C36 | 0.0000.E+00 |

Numerical Example 2

Numerical Example 2 is another example of the projection optical system of the first exemplary embodiment. Configuration data of the projection optical system of Numerical Example 2 is shown in Table 4, curvatures of windshield 22 are shown in Table 5, and coefficients of the polynomial free-form surface are shown in Table 6.

TABLE 4

| SURFACE | | | ECCENTRICITY DATA | | | | |
|---|---|---|---|---|---|---|---|
| NUMBER | SHAPE | X | Y | Z | ADE | BDE | CDE |
| DISPLAY SURFACE | 1 | | 0 | 0 | 0 | 0 | 0 | 0 |
| FIRST MIRROR | 2 | FREE-FORM SURFACE | −2.43576 | 10.33355 | 38.56533 | −28.6109 | −3.4249 | −3.6107 |
| SECOND MIRROR | 3 | FREE-FORM SURFACE | −26.878 | 167.75641 | −10.41221 | −50.6795 | −2.4557 | −12.2642 |
| WINDSHIELD | 4 | TOROIDAL | −40.89275 | 60.26763 | 207.28836 | 33.8254 | −6.7179 | −4.3545 |
| OBSERVER | 5 | | −247.195 | −755.5801 | 359.24694 | 93.6384 | −10.5797 | 9.2937 |

TABLE 5

| SURFACE NUMBER | X-CURVATURE | Y-CURVATURE |
|---|---|---|
| 4 | −1.06E−04 | −0.000309 |

TABLE 6

| SURFACE NUMBER | POLYNOMIAL COEFFICIENT | | | |
|---|---|---|---|---|
| 2 | c (CURVATURE) | | 6.0465.E−03 | |
| | C1 | 0.0000.E+00 | C19 | 7.4033.E−09 |
| | C2 | 0.0000.E+00 | C20 | −3.4565.E−09 |
| | C3 | 0.0000.E+00 | C21 | −4.5553.E−09 |
| | C4 | −1.4248.E−03 | C22 | 1.4455.E−11 |
| | C5 | 1.2817.E−04 | C23 | 1.6716.E−11 |
| | C6 | −2.6737.E−03 | C24 | −6.2089.E−11 |
| | C7 | 2.3419.E−06 | C25 | −1.0251.E−11 |
| | C8 | −1.0763.E−05 | C26 | −1.8361.E−11 |
| | C9 | 3.1828.E−06 | C27 | 2.9951.E−11 |
| | C10 | 1.7057.E−05 | C28 | 2.4835.E−10 |
| | C11 | −2.6033.E−07 | C29 | 0.0000.E+00 |
| | C12 | −1.0927.E−07 | C30 | 0.0000.E+00 |
| | C13 | −7.5508.E−09 | C31 | 0.0000.E+00 |
| | C14 | −2.5065.E−10 | C32 | 0.0000.E+00 |
| | C15 | −6.1043.E−07 | C33 | 0.0000.E+00 |
| | C16 | −3.8848.E−10 | C34 | 0.0000.E+00 |
| | C17 | 1.7274.E−09 | C35 | 0.0000.E+00 |
| | C18 | 1.5050.E−10 | C36 | 0.0000.E+00 |
| 3 | c (CURVATURE) | | −3.4906.E−03 | |
| | C1 | 0.0000.E+00 | C19 | 2.3641.E−11 |

TABLE 6-continued

| SURFACE NUMBER | POLYNOMIAL COEFFICIENT | | | |
|---|---|---|---|---|
| | C2 | 0.0000.E+00 | C20 | 8.3467.E−12 |
| | C3 | 0.0000.E+00 | C21 | −2.4309.E−11 |
| | C4 | 2.9247.E−03 | C22 | 5.7955.E−14 |
| | C5 | 1.3972.E−04 | C23 | −9.3766.E−16 |
| | C6 | 2.7378.E−03 | C24 | 1.3337.E−13 |
| | C7 | 4.5889.E−07 | C25 | −7.9522.E−14 |
| | C8 | −6.9524.E−07 | C26 | 2.7386.E−13 |
| | C9 | 2.2392.E−07 | C27 | −1.3314.E−13 |
| | C10 | −2.9543.E−07 | C28 | 2.5418.E−13 |
| | C11 | 5.3597.E−09 | C29 | 0.0000.E+00 |
| | C12 | −4.1093.E−10 | C30 | 0.0000.E+00 |
| | C13 | 1.1795.E−08 | C31 | 0.0000.E+00 |
| | C14 | 1.0759.E−09 | C32 | 0.0000.E+00 |
| | C15 | 2.7512.E−09 | C33 | 0.0000.E+00 |
| | C16 | 4.4084.E−13 | C34 | 0.0000.E+00 |
| | C17 | −1.8777.E−12 | C35 | 0.0000.E+00 |
| | C18 | −6.7894.E−12 | C36 | 0.0000.E+00 |

Numerical Example 3

Numerical Example 3 is still another example of the projection optical system of the first exemplary embodiment. Configuration data of the projection optical system of Numerical Example 3 is shown in Table 7, curvatures of windshield 22 are shown in Table 8, and coefficients of the polynomial free-form surface are shown in Table 9.

TABLE 7

| SURFACE | | | ECCENTRICITY DATA | | | | |
|---|---|---|---|---|---|---|---|
| NUMBER | SHAPE | X | Y | Z | ADE | BDE | CDE |
| DISPLAY SURFACE | 1 | | 0 | 0 | 0 | 0 | 0 | 0 |
| FIRST MIRROR | 2 | FREE-FORM SURFACE | 0 | 24.55719 | 91.64868 | −4.5529 | −5.9181 | 16.1886 |
| SECOND MIRROR | 3 | FREE-FORM SURFACE | −30.901 | 89.5987 | −51.08911 | 3.7742 | −9.8653 | 16.9701 |
| WINDSHIELD | 4 | TOROIDAL | −1.10167 | 216.53135 | 172.69537 | 97.4684 | −4.9215 | 7.3888 |
| OBSERVER | 5 | | 27.54195 | −28.10958 | 934.46107 | 159.3289 | 1.4449 | 13.0207 |

TABLE 8

| SURFACE NUMBER | X-CURVATURE | Y-CURVATURE |
|---|---|---|
| 4 | −8.75E−05 | −0.000371 |

TABLE 9

| SURFACE NUMBER | POLYNOMIAL COEFFICIENT | | | |
|---|---|---|---|---|
| 2 | c (CURVATURE) | | 4.4131.E−03 | |
| | C1 | 0.0000.E+00 | C19 | −8.0175.E−10 |
| | C2 | 0.0000.E+00 | C20 | −6.0289.E−11 |
| | C3 | 0.0000.E+00 | C21 | 1.0100.E−10 |
| | C4 | −1.6067.E−03 | C22 | 0.0000.E+00 |
| | C5 | −7.2191.E−05 | C23 | 0.0000.E+00 |
| | C6 | −1.9192.E−03 | C24 | 0.0000.E+00 |
| | C7 | 1.1617.E−06 | C25 | 0.0000.E+00 |
| | C8 | −4.2715.E−06 | C26 | 0.0000.E+00 |
| | C9 | −5.3771.E−06 | C27 | 0.0000.E+00 |
| | C10 | −8.4759.E−06 | C28 | 0.0000.E+00 |
| | C11 | −1.1129.E−08 | C29 | 0.0000.E+00 |
| | C12 | 8.7451.E−09 | C30 | 0.0000.E+00 |
| | C13 | −1.8185.E−08 | C31 | 0.0000.E+00 |
| | C14 | −1.2828.E−08 | C32 | 0.0000.E+00 |
| | C15 | 1.9920.E−08 | C33 | 0.0000.E+00 |
| | C16 | 4.8471.E−12 | C34 | 0.0000.E+00 |
| | C17 | −2.1453.E−10 | C35 | 0.0000.E+00 |
| | C18 | −5.3282.E−10 | C36 | 0.0000.E+00 |
| 3 | c (CURVATURE) | | −2.9140.E−03 | |
| | C1 | 0.0000.E+00 | C19 | −2.3989.E−11 |
| | C2 | 0.0000.E+00 | C20 | −9.9696.E−12 |
| | C3 | 0.0000.E+00 | C21 | 2.5720.E−13 |
| | C4 | 2.3038.E−03 | C22 | 0.0000.E+00 |
| | C5 | −1.2979.E−04 | C23 | 0.0000.E+00 |
| | C6 | 2.0921.E−03 | C24 | 0.0000.E+00 |
| | C7 | −1.3564.E−08 | C25 | 0.0000.E+00 |
| | C8 | −7.7120.E−07 | C26 | 0.0000.E+00 |
| | C9 | −2.7921.E−07 | C27 | 0.0000.E+00 |
| | C10 | −9.8937.E−07 | C28 | 0.0000.E+00 |
| | C11 | 3.6325.E−09 | C29 | 0.0000.E+00 |
| | C12 | 2.4436.E−10 | C30 | 0.0000.E+00 |
| | C13 | 7.4354.E−09 | C31 | 0.0000.E+00 |
| | C14 | −1.4554.E−09 | C32 | 0.0000.E+00 |
| | C15 | 3.7965.E−09 | C33 | 0.0000.E+00 |
| | C16 | 5.0576.E−13 | C34 | 0.0000.E+00 |
| | C17 | −5.6881.E−12 | C35 | 0.0000.E+00 |
| | C18 | −1.3012.E−11 | C36 | 0.0000.E+00 |

Numerical Example 4

Numerical Example 4 is still another example of the projection optical system of the first exemplary embodiment. Configuration data of the projection optical system of Numerical Example 4 is shown in Table 10, curvatures of windshield 22 are shown in Table 11, and coefficients of the polynomial free-form surface are shown in Table 12.

TABLE 10

| | SURFACE NUMBER | SHAPE | ECCENTRICITY DATA | | | | | |
|---|---|---|---|---|---|---|---|---|
| | | | X | Y | Z | ADE | BDE | CDE |
| DISPLAY SURFACE | 1 | | 0 | 0 | 0 | 0 | 0 | 0 |
| FIRST MIRROR | 2 | FREE-FORM SURFACE | −0.4157 | 9.05801 | 33.80502 | −30.132 | −2.195 | −3.2509 |
| SECOND MIRROR | 3 | FREE-FORM SURFACE | −8.33509 | 125.19773 | 3.52092 | −50.1257 | −0.5926 | −33.2773 |
| WINDSHIELD | 4 | TOROIDAL | −19.52742 | 29.73566 | 230.26281 | 37.2674 | −7.5258 | −3.4212 |
| OBSERVER | 5 | | −159.8021 | −792.7372 | 395.2009 | 96.7615 | −10.368 | 10.5764 |

TABLE 11

| SURFACE NUMBER | X-CURVATURE | Y-CURVATURE |
|---|---|---|
| 4 | −6.18E−05 | −0.000318 |

TABLE 12

| SURFACE NUMBER | POLYNOMIAL COEFFICIENT | | | |
|---|---|---|---|---|
| 2 | c (CURVATURE) | | 9.9474.E−03 | |
| | C1 | 0.0000.E+00 | C19 | 1.2928.E−08 |
| | C2 | 0.0000.E+00 | C20 | −4.1116.E−09 |
| | C3 | 0.0000.E+00 | C21 | −1.6182.E−08 |
| | C4 | −2.7874.E−03 | C22 | 1.2822.E−10 |
| | C5 | 3.1220.E−04 | C23 | 8.5762.E−11 |
| | C6 | −3.9205.E−03 | C24 | −2.7323.E−10 |
| | C7 | 2.5867.E−06 | C25 | −1.4425.E−10 |
| | C8 | −8.7058.E−08 | C26 | 4.3563.E−10 |
| | C9 | 8.8369.E−07 | C27 | 5.7801.E−10 |
| | C10 | 4.2905.E−05 | C28 | 1.8765.E−09 |
| | C11 | −8.6851.E−07 | C29 | 0.0000.E+00 |
| | C12 | −2.5282.E−07 | C30 | 0.0000.E+00 |
| | C13 | −2.9363.E−07 | C31 | 0.0000.E+00 |
| | C14 | −2.9756.E−07 | C32 | 0.0000.E+00 |
| | C15 | −2.3471.E−06 | C33 | 0.0000.E+00 |
| | C16 | −3.5614.E−10 | C34 | 0.0000.E+00 |
| | C17 | −1.4889.E−10 | C35 | 0.0000.E+00 |
| | C18 | 1.8041.E−09 | C36 | 0.0000.E+00 |
| 3 | c (CURVATURE) | | −2.2258.E−03 | |
| | C1 | 0.0000.E+00 | C19 | −1.3193.E−10 |
| | C2 | 0.0000.E+00 | C20 | 1.4048.E−10 |
| | C3 | 0.0000.E+00 | C21 | −3.9000.E−11 |
| | C4 | 2.6561.E−03 | C22 | −8.7257.E−15 |
| | C5 | 3.0955.E−04 | C23 | 6.6300.E−14 |
| | C6 | 2.5907.E−03 | C24 | 4.9183.E−13 |
| | C7 | 1.0666.E−06 | C25 | −9.5936.E−13 |
| | C8 | −3.9048.E−07 | C26 | 2.1778.E−12 |
| | C9 | −1.3366.E−07 | C27 | −2.4363.E−12 |
| | C10 | −5.2022.E−07 | C28 | 9.2220.E−13 |
| | C11 | 2.8793.E−09 | C29 | 0.0000.E+00 |
| | C12 | −1.3957.E−09 | C30 | 0.0000.E+00 |
| | C13 | −8.1263.E−09 | C31 | 0.0000.E+00 |
| | C14 | 1.6218.E−08 | C32 | 0.0000.E+00 |
| | C15 | −4.5654.E−09 | C33 | 0.0000.E+00 |
| | C16 | 4.5848.E−13 | C34 | 0.0000.E+00 |
| | C17 | 1.0740.E−11 | C35 | 0.0000.E+00 |
| | C18 | 2.1002.E−11 | C36 | 0.0000.E+00 |

Numerical Example 5

Numerical Example 5 is still another example of the projection optical system of the first exemplary embodiment. Configuration data of the projection optical system of Numerical Example 5 is shown in Table 13, curvatures of windshield 22 are shown in Table 14, and coefficients of the polynomial free-form surface are shown in Table 15.

TABLE 13

| SURFACE | | | ECCENTRICITY DATA | | | | | |
|---|---|---|---|---|---|---|---|---|
| | NUMBER | SHAPE | X | Y | Z | ADE | BDE | CDE |
| DISPLAY SURFACE | 1 | | 0 | 0 | 0 | 0 | 0 | 0 |
| FIRST MIRROR | 2 | FREE-FORM SURFACE | 1.14724 | 10.1204 | 33.48524 | −28.7028 | −2.437 | −5.9176 |
| SECOND MIRROR | 3 | FREE-FORM SURFACE | −1.67099 | 111.12287 | 4.92722 | −44.3799 | −1.0038 | −32.8683 |
| WINDSHIELD | 4 | TOROIDAL | −131.1246 | −718.9349 | 555.14822 | 107.6615 | −9.9718 | 13.8129 |
| OBSERVER | 5 | | −131.1246 | −718.9349 | 555.14822 | 107.6615 | −9.9718 | 13.8129 |

TABLE 14

| SURFACE NUMBER | X-CURVATURE | Y-CURVATURE |
|---|---|---|
| 4 | −6.18E−05 | −0.000318 |

TABLE 15

| SURFACE NUMBER | POLYNOMIAL COEFFICIENT | | | |
|---|---|---|---|---|
| 2 | c (CURVATURE) | | 1.0098.E−02 | |
| | C1 | 0.0000.E+00 | C19 | 1.3542.E−08 |
| | C2 | 0.0000.E+00 | C20 | −9.0933.E−09 |
| | C3 | 0.0000.E+00 | C21 | 8.8017.E−09 |
| | C4 | −1.8583.E−03 | C22 | 3.7032.E−11 |
| | C5 | 5.6895.E−04 | C23 | 6.5607.E−11 |
| | C6 | −4.1186.E−03 | C24 | −2.7940.E−10 |
| | C7 | 4.7234.E−06 | C25 | −1.3790.E−11 |
| | C8 | −4.5758.E−05 | C26 | −1.8564.E−10 |
| | C9 | 5.5342.E−06 | C27 | 1.3910.E−10 |
| | C10 | 7.2004.E−06 | C28 | 3.0544.E−10 |
| | C11 | −7.1443.E−07 | C29 | 0.0000.E+00 |
| | C12 | −1.5873.E−07 | C30 | 0.0000.E+00 |
| | C13 | −1.5710.E−07 | C31 | 0.0000.E+00 |
| | C14 | −4.7735.E−07 | C32 | 0.0000.E+00 |
| | C15 | −6.9026.E−07 | C33 | 0.0000.E+00 |
| | C16 | −1.4776.E−09 | C34 | 0.0000.E+00 |
| | C17 | 1.3956.E−08 | C35 | 0.0000.E+00 |
| | C18 | 3.5130.E−09 | C36 | 0.0000.E+00 |

TABLE 15-continued

| SURFACE NUMBER | POLYNOMIAL COEFFICIENT | | | |
|---|---|---|---|---|
| 3 | c (CURVATURE) | | −1.7525.E−03 | |
| | C1 | 0.0000.E+00 | C19 | 1.5271.E−10 |
| | C2 | 0.0000.E+00 | C20 | −9.0838.E−11 |
| | C3 | 0.0000.E+00 | C21 | 3.8238.E−11 |
| | C4 | 2.6523.E−03 | C22 | −5.4280.E−14 |
| | C5 | 4.6597.E−04 | C23 | −1.8517.E−13 |
| | C6 | 2.4375.E−03 | C24 | −5.7799.E−15 |
| | C7 | 1.7384.E−06 | C25 | 2.6338.E−13 |
| | C8 | −1.7762.E−06 | C26 | −3.7790.E−13 |
| | C9 | 3.8386.E−07 | C27 | −2.5262.E−13 |
| | C10 | −1.6548.E−06 | C28 | 6.9553.E−14 |
| | C11 | 4.0060.E−09 | C29 | 0.0000.E+00 |
| | C12 | −4.0743.E−09 | C30 | 0.0000.E+00 |
| | C13 | 6.8299.E−09 | C31 | 0.0000.E+00 |
| | C14 | 2.2004.E−09 | C32 | 0.0000.E+00 |
| | C15 | 1.3564.E−09 | C33 | 0.0000.E+00 |
| | C16 | −2.6466.E−12 | C34 | 0.0000.E+00 |
| | C17 | 4.3317.E−11 | C35 | 0.0000.E+00 |
| | C18 | −1.2544.E−10 | C36 | 0.0000.E+00 |

Numerical Example 6

Numerical Example 6 is an example of the projection optical system of the second exemplary embodiment. Configuration data of the projection optical system of Numerical Example 6 is shown in Table 16, curvatures of windshield 22 are shown in Table 17, and coefficients of the polynomial free-form surface are shown in Table 18.

TABLE 16

| SURFACE | | | ECCENTRICITY DATA | | | | | |
|---|---|---|---|---|---|---|---|---|
| | NUMBER | SHAPE | X | Y | Z | ADE | BDE | CDE |
| DISPLAY SURFACE | 1 | | 0 | 0 | 0 | 0 | 0 | 0 |
| LENS R1 | 2 | FREE-FORM SURFACE | −1.08117 | 12.16169 | −45.38639 | −15.0005 | −1.3181 | −1.2288 |
| LENS R2 | 3 | FREE-FORM SURFACE | −1.30755 | 14.70817 | −54.88966 | −15.0005 | −1.3181 | −1.2288 |
| MIRROR | 4 | FREE-FORM SURFACE | −3.52234 | 67.44536 | −162.6574 | −1.2385 | −1.5726 | −21.4761 |
| WINDSHIELD | 5 | TOROIDAL | 3.89623 | 166.39526 | 55.4058 | 87.3882 | −6.0267 | −2.5112 |
| OBSERVER | 6 | | −48.01393 | −239.4276 | 801.19965 | 146.7925 | −4.5127 | 12.1499 |

TABLE 17

| SURFACE NUMBER | X-CURVATURE | Y-CURVATURE |
|---|---|---|
| 5 | −0.000126 | −0.000316 |

TABLE 18

| SURFACE NUMBER | POLYNOMIAL COEFFICIENT | | | |
|---|---|---|---|---|
| 2 | c (CURVATURE) | | 0.0000.E+00 | |
| | C1 | 0.0000.E+00 | C19 | 0.0000.E+00 |
| | C2 | 0.0000.E+00 | C20 | 0.0000.E+00 |
| | C3 | 0.0000.E+00 | C21 | 0.0000.E+00 |
| | C4 | 9.3227.E−03 | C22 | 0.0000.E+00 |
| | C5 | 0.0000.E+00 | C23 | 0.0000.E+00 |
| | C6 | 0.0000.E+00 | C24 | 0.0000.E+00 |
| | C7 | 1.1488.E−06 | C25 | 0.0000.E+00 |
| | C8 | 0.0000.E+00 | C26 | 0.0000.E+00 |
| | C9 | 0.0000.E+00 | C27 | 0.0000.E+00 |
| | C10 | 0.0000.E+00 | C28 | 0.0000.E+00 |
| | C11 | 6.3387.E−07 | C29 | 0.0000.E+00 |
| | C12 | 0.0000.E+00 | C30 | 0.0000.E+00 |
| | C13 | 0.0000.E+00 | C31 | 0.0000.E+00 |
| | C14 | 0.0000.E+00 | C32 | 0.0000.E+00 |
| | C15 | 0.0000.E+00 | C33 | 0.0000.E+00 |
| | C16 | −3.4387.E−12 | C34 | 0.0000.E+00 |
| | C17 | 0.0000.E+00 | C35 | 0.0000.E+00 |
| | C18 | 0.0000.E+00 | C36 | 0.0000.E+00 |
| 3 | c (CURVATURE) | | −9.8310.E−03 | |
| | C1 | 0.0000.E+00 | C19 | −8.7787.E−10 |
| | C2 | 0.0000.E+00 | C20 | 6.2481.E−09 |
| | C3 | −3.7432.E−01 | C21 | −1.3134.E−08 |
| | C4 | 7.6845.E−03 | C22 | −5.8173.E−08 |
| | C5 | −1.7986.E−04 | C23 | 0.0000.E+00 |
| | C6 | 2.0104.E−03 | C24 | 0.0000.E+00 |
| | C7 | 1.5035.E−07 | C25 | 0.0000.E+00 |
| | C8 | −6.0979.E−06 | C26 | 0.0000.E+00 |
| | C9 | −9.9234.E−06 | C27 | 0.0000.E+00 |
| | C10 | 1.5275.E−04 | C28 | 0.0000.E+00 |
| | C11 | 1.0952.E−07 | C29 | 0.0000.E+00 |
| | C12 | 1.5392.E−08 | C30 | 0.0000.E+00 |
| | C13 | 3.8938.E−07 | C31 | 0.0000.E+00 |
| | C14 | 7.2298.E−07 | C32 | 0.0000.E+00 |
| | C15 | 7.5414.E−07 | C33 | 0.0000.E+00 |
| | C16 | −1.6094.E−10 | C34 | 0.0000.E+00 |
| | C17 | 2.2914.E−09 | C35 | 0.0000.E+00 |
| | C18 | −8.7787.E−10 | C36 | 0.0000.E+00 |
| 4 | c (CURVATURE) | | −3.2029.E−03 | |
| | C1 | 0.0000.E+00 | C19 | 6.6696.E−11 |
| | C2 | 0.0000.E+00 | C20 | −1.1333.E−10 |
| | C3 | 0.0000.E+00 | C21 | 4.6679.E−11 |
| | C4 | 2.9873.E−03 | C22 | 4.0969.E−14 |
| | C5 | 1.8251.E−04 | C23 | 3.2624.E−14 |
| | C6 | 2.7611.E−03 | C24 | 2.4682.E−13 |
| | C7 | 3.5711.E−07 | C25 | −5.3677.E−13 |
| | C8 | −1.0881.E−06 | C26 | 1.1448.E−12 |
| | C9 | 7.5889.E−07 | C27 | −1.0882.E−12 |
| | C10 | −1.1734.E−06 | C28 | 5.1824.E−13 |
| | C11 | 5.2778.E−09 | C29 | 1.5400.E−17 |
| | C12 | −1.6606.E−09 | C30 | −7.6869.E−17 |
| | C13 | 9.4412.E−09 | C31 | 1.4488.E−15 |
| | C14 | 6.2471.E−09 | C32 | −7.5014.E−15 |
| | C15 | 6.8826.E−10 | C33 | 2.0177.E−14 |
| | C16 | 1.9435.E−12 | C34 | −2.8689.E−14 |
| | C17 | −7.2150.E−12 | C35 | 2.0761.E−14 |
| | C18 | −1.1475.E−11 | C36 | −5.8967.E−15 |

Numerical Example 7

Numerical Example 7 is an example of the projection optical system of the third exemplary embodiment. Configuration data of the projection optical system of Numerical Example 7 is shown in Table 19, and coefficients of the polynomial free-form surface are shown in Table 20.

TABLE 19

| SURFACE | | | ECCENTRICITY DATA | | | | | |
|---|---|---|---|---|---|---|---|---|
| | NUMBER | SHAPE | X | Y | Z | ADE | BDE | CDE |
| DISPLAY SURFACE | 1 | | 0 | 0 | 0 | 0 | 0 | 0 |
| MIRROR | 2 | FREE-FORM SURFACE | 0 | −19.81411 | −52.86912 | −21.9549 | 0 | 0 |
| COMBINER | 3 | FREE-FORM SURFACE | 0 | −123.5722 | −3.27818 | −36.7612 | 0 | 0 |
| OBSERVER | 4 | | 0 | 18.3365 | −892.4407 | −9.0678 | 0 | 0 |

TABLE 20

| SURFACE NUMBER | POLYNOMIAL COEFFICIENT | | | |
|---|---|---|---|---|
| 2 | c (CURVATURE) | | −8.1463.E−03 | |
| | C1 | 0.0000.E+00 | C19 | 0.0000.E+00 |
| | C2 | 0.0000.E+00 | C20 | 0.0000.E+00 |
| | C3 | 0.0000.E+00 | C21 | 0.0000.E+00 |
| | C4 | 5.4488.E−04 | C22 | 0.0000.E+00 |
| | C5 | 0.0000.E+00 | C23 | 0.0000.E+00 |
| | C6 | 2.3566.E−03 | C24 | 0.0000.E+00 |
| | C7 | 0.0000.E+00 | C25 | 0.0000.E+00 |
| | C8 | −3.7671.E−05 | C26 | 0.0000.E+00 |
| | C9 | 0.0000.E+00 | C27 | 0.0000.E+00 |
| | C10 | −1.9474.E−05 | C28 | 0.0000.E+00 |
| | C11 | 7.3479.E−08 | C29 | 0.0000.E+00 |
| | C12 | 0.0000.E+00 | C30 | 0.0000.E+00 |
| | C13 | 2.5860.E−08 | C31 | 0.0000.E+00 |
| | C14 | 0.0000.E+00 | C32 | 0.0000.E+00 |
| | C15 | 1.8545.E−08 | C33 | 0.0000.E+00 |
| | C16 | 0.0000.E+00 | C34 | 0.0000.E+00 |
| | C17 | 0.0000.E+00 | C35 | 0.0000.E+00 |
| | C18 | 0.0000.E+00 | C36 | 0.0000.E+00 |
| 3 | c (CURVATURE) | | 2.4826.E−03 | |

TABLE 20-continued

| SURFACE NUMBER | POLYNOMIAL COEFFICIENT | | | |
|---|---|---|---|---|
| C1 | 0.0000.E+00 | C19 | 0.0000.E+00 |
| C2 | 0.0000.E+00 | C20 | 0.0000.E+00 |
| C3 | 0.0000.E+00 | C21 | 0.0000.E+00 |
| C4 | −2.9314.E−03 | C22 | 0.0000.E+00 |
| C5 | 0.0000.E+00 | C23 | 0.0000.E+00 |
| C6 | −2.5668.E−03 | C24 | 0.0000.E+00 |
| C7 | 0.0000.E+00 | C25 | 0.0000.E+00 |
| C8 | −2.2485.E−06 | C26 | 0.0000.E+00 |
| C9 | 0.0000.E+00 | C27 | 0.0000.E+00 |
| C10 | −1.7560.E−06 | C28 | 0.0000.E+00 |
| C11 | −4.5664.E−09 | C29 | 0.0000.E+00 |
| C12 | 0.0000.E+00 | C30 | 0.0000.E+00 |
| C13 | −6.2913.E−09 | C31 | 0.0000.E+00 |
| C14 | 0.0000.E+00 | C32 | 0.0000.E+00 |
| C15 | −1.6992.E−09 | C33 | 0.0000.E+00 |
| C16 | 0.0000.E+00 | C34 | 0.0000.E+00 |
| C17 | 0.0000.E+00 | C35 | 0.0000.E+00 |
| C18 | 0.0000.E+00 | C36 | 0.0000.E+00 |

Summary of Numerical Examples

Table 21 shows examples of image display sizes (corresponding to display image 71 of LCD 13), virtual image sizes (corresponding to an angle of view), and virtual image distances VID from a virtual image to a viewpoint of an observer with respect to Numerical Examples 1 to 7 of the first to third exemplary embodiments. Further, Table 22 shows the values of Conditional Relations 1 to 3 of Numerical Examples 1 to 7 corresponding to the first to third exemplary embodiments.

TABLE 21

| | | NUMERICAL EXAMPLE 1 | NUMERICAL EXAMPLE 2 | NUMERICAL EXAMPLE 3 | NUMERICAL EXAMPLE 4 | NUMERICAL EXAMPLE 5 | NUMERICAL EXAMPLE 6 | NUMERICAL EXAMPLE 7 |
|---|---|---|---|---|---|---|---|---|
| DISPLAY SIZE | X | 66.50 | 66.69 | 67.12 | 39.14 | 39.95 | 62.90 | 66.41 |
| | Y | 27.15 | 22.10 | 29.17 | 15.72 | 15.88 | 27.46 | 23.29 |
| VIRTUAL IMAGE SIZE (deg) | X | 10 | 13 | 7 | 9 | 8 | 10 | 10 |
| | Y | 4 | 4 | 3 | 3 | 3 | 4 | 3 |
| VID(mm) | | 2800 | 7000 | 2500 | 4000 | 3000 | 3000 | 2500 |

TABLE 22

| | NUMERICAL EXAMPLE 1 | NUMERICAL EXAMPLE 2 | NUMERICAL EXAMPLE 3 | NUMERICAL EXAMPLE 4 | NUMERICAL EXAMPLE 5 | NUMERICAL EXAMPLE 6 | NUMERICAL EXAMPLE 7 |
|---|---|---|---|---|---|---|---|
| $|\theta_{zmax} - \theta_{zmin}|$ (deg) | 14.9 | 14.6 | 10.7 | 20.4 | 23.4 | 17.3 | 20.7 |
| LM/LD | 3.5 | 4.2 | 1.7 | 3.4 | 3.0 | 2.6 | 2.0 |
| LWS/VID | 0.30 | 0.12 | 0.33 | 0.21 | 0.28 | 0.28 | 0.36 |

As shown in Table 22, it is understood that the projection optical systems implemented in Numerical Examples 1 to 7 satisfy the above Conditional Relation 1 to Conditional Relation 3.

These values show that it possible to achieve a virtual image display device that is small and causes no interference or the like.

Note that, since the above exemplary embodiments are for illustrating the technique in the present disclosure, various modifications, replacements, additions, omissions, or the like can be made without departing from the scope of the accompanying claims or the equivalent thereof.

INDUSTRIAL APPLICABILITY

The virtual image display device according to the present disclosure is suitable for a head-up display to be mounted on a vehicle or the like.

REFERENCE MARKS IN THE DRAWINGS

10: head-up display (virtual image display device)
11: final reflector
12: reflector
13: LCD
20: vehicle
21: dashboard
22: windshield
30: observer
31: eye box
40: virtual image
50: lens element
60: combiner
71: display image
L: central optical path
N1, N2: normal vector

The invention claimed is:
1. A virtual image display device that projects an image on a projection target member to form a virtual image opposing an observer via the projection target member, the virtual image display device comprising:
a projection member that projects the image; and
a projection optical system that leads the image to the projection target member to form the virtual image,
wherein
a virtual image distance VID from a center of a visual recognition area of the observer to a center of the virtual image is not less than 2,500 mm,
the projection optical system includes, in order from the projection member to the virtual image:
a first optical element being either one of a lens element and a reflector; and
a final reflector, a reflection surface of the final reflector satisfies Conditional Relation 1, on an optical path extending from the projection member to the virtual image:

$$10° \leq |\theta z\ max - \theta z\ min| \leq 30°$$ Conditional Relation 1 where:

θz is an angle between a normal vector perpendicular to a tangent plane passing through an origin of a definitional equation defining a shape of the final reflector and a normal vector with respect to a tangent plane at any given point on the final reflector;

θz max is a maximum value of θz; and

θz min is a minimum value of θz, and wherein following Conditional Relation 3 is satisfied:

$$1.0 \leq LM/LD \leq 8.0$$ Conditional Relation 3 where:

LM is a distance between the final reflector and the first optical element, on a central optical path of the projection optical system extending from the projection member to the virtual image; and LD is a distance from the projection member to the first optical element, on the central optical path.

2. The virtual image display device according to claim 1, wherein following Conditional Relation 2 is satisfied:

$$0 \leq LWS/VID \leq 0.60$$ Conditional Relation 2 where LWS is a distance from the observer to the projection target member, on a straight line connecting from the center of the visual recognition area of the observer to the center of the virtual image.

3. The virtual image display device according to claim 1, wherein the final reflector is rotationally asymmetric and has a concave shape toward the observer.

4. The virtual image display device according to claim 1, wherein the first optical element is a lens element, and the lens element has a rotationally asymmetric shape.

5. The virtual image display device according to claim 1, wherein the projection target member is a windshield mounted on a mobile object.

6. A virtual image display device that projects an image on a projection target member to form a virtual image opposing an observer via the projection target member, the virtual image display device comprising:

a projection member that projects the image; and a projection optical system that leads the image to the projection target member to form the virtual image, wherein a virtual image distance VID from a center of a visual recognition area of the observer to a center of the virtual image is not less than 2,500 mm, the projection optical system includes, in order from the projection member to the virtual image:

a first optical element being either one of a lens element and a reflector; and a final reflector, a reflection surface of the final reflector satisfies Conditional Relation 1, on an optical path extending from the projection member to the virtual image:

$$10° \leq |\theta z\ max - \theta z\ min| \leq 30°$$ Conditional Relation 1 where:

θz is an angle between a normal vector perpendicular to a tangent plane passing through an origin of a definitional equation defining a shape of the final reflector and a normal vector with respect to a tangent plane at any given point on the final reflector;

θz max is a maximum value of θz; and

θz min is a minimum value of θz, and wherein each of the final reflector and the projection target member is a combiner.

* * * * *